(No Model.)

P. DUNN.
NUT LOCK.

No. 363,052.  Patented May 17, 1887.

Witnesses
William P. Allen
George Underwood

Inventor
Patrick Dunn
By his Attorney
Frederick J. Allen

UNITED STATES PATENT OFFICE.

PATRICK DUNN, OF AUBURN, NEW YORK.

NUT-LOCK.

SPECIFICATION forming part of Letters Patent No. 363,052, dated May 17, 1887.

Application filed May 3, 1886. Serial No. 200,913. (No model.)

*To all whom it may concern:*

Be it known that I, PATRICK DUNN, of the city of Auburn, New York, have invented certain new and useful Improvements in Nut-Locks, of which the following is a full and exact description, reference being made to the accompanying drawings, forming part of this specification, in which—

Figure 1:
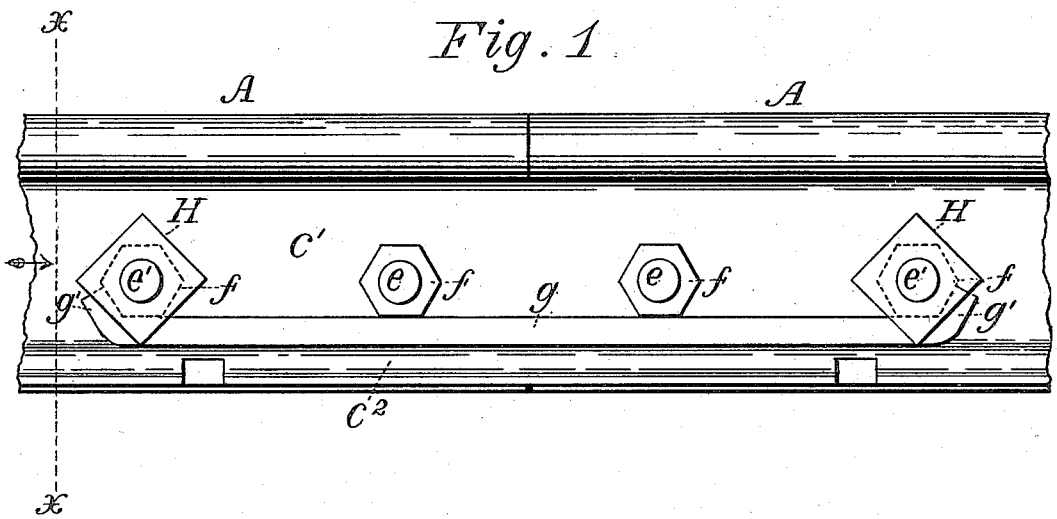
Figure 2:
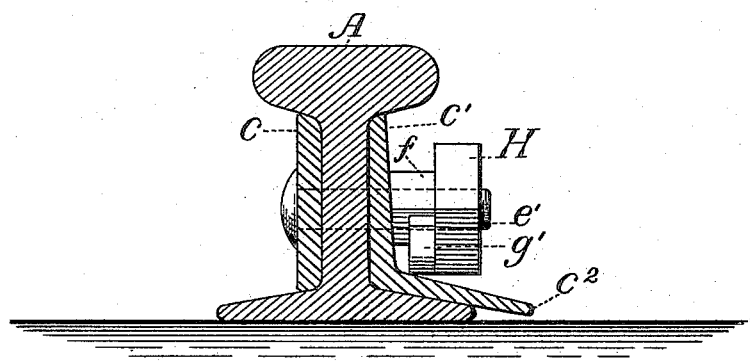

Figure 1 is a side view; and Fig. 2, an end view, partly in section, the section being indicated by the line $x\,x$, Fig. 1.

A A, Fig. 1, are the extremities of the rails, which are secured together by the usual arrangement of fish-plates C C', with bolts passing through them, $e'\,e\,e\,e'$, which are secured by the nuts $f\,f\,f\,f$. Having this construction, it is the object of my invention to furnish a secure, simple, and economical nut-lock, whereby the nuts $f\,f\,f\,f$ shall be prevented from moving from the position in which they shall be set. I obtain such a lock by using at the ends of the fish-plate bolts $e'\,e'$ long enough to take upon them another nut, H H, and the rod $g$, which is secured beneath said nuts H H, and which rests against the faces of the nuts $f\,f\,f\,f$, being supported, as shown in Fig. 2, upon the flange $C^2$ of the fish-plate C'.

The rod $g$ is kept in position endwise by having its ends turned up or by having such projections upon each end as to correspond to the upturned extremities $g'\,g'$. After the rod $g$ is placed in position, the large nuts H H, which are of sufficient size to extend beyond the nuts $f\,f\,f\,f$ and overlap the rod $g$, are screwed up, and the nuts $f$ are effectively locked to their places.

Having thus described my invention, what I claim as new, and desire to secure by Letters Patent, is—

As an improvement in nut-locks, the combination of the fish-plates, the bolts $e'\,e\,e\,e'$, the nuts $f\,f\,f\,f$, the locking-rod $g$, provided with laterally-extending ends $g'\,g'$, and the locking-nuts H H, all substantially as described.

PATRICK DUNN.

Witnesses:
 FREDERICK I. ALLEN,
 WILLIAM P. ALLEN.